United States Patent
Koide et al.

(10) Patent No.: US 7,959,418 B2
(45) Date of Patent: Jun. 14, 2011

(54) MOUNTING STRUCTURE AND MOTOR COMPRESSOR HAVING THE SAME

(75) Inventors: Tatsuya Koide, Kariya (JP); Masanori Sonobe, Kariya (JP); Ken Suitou, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 369 days.

(21) Appl. No.: 11/593,175

(22) Filed: Nov. 3, 2006

(65) Prior Publication Data

US 2007/0103015 A1 May 10, 2007

(30) Foreign Application Priority Data

Nov. 4, 2005 (JP) ................ 2005-320701

(51) Int. Cl.
*F04B 19/12* (2006.01)
(52) U.S. Cl. .............. 417/410.1; 417/902; 277/609; 277/616; 439/559
(58) Field of Classification Search .......... 174/54, 174/58, 61, 64; 439/559, 562; 417/410.1, 417/410.5
See application file for complete search history.

(56) References Cited

U.S. PATENT DOCUMENTS

| | | | | |
|---|---|---|---|---|
| 3,803,531 A | * | 4/1974 | Sorensen | 439/190 |
| 4,492,421 A | * | 1/1985 | Ito | 439/271 |
| 4,761,146 A | * | 8/1988 | Sohoel | 439/584 |
| 5,700,012 A | * | 12/1997 | Froehlich et al. | 277/619 |
| 5,704,809 A | * | 1/1998 | Davis | 439/578 |
| 6,409,179 B1 | * | 6/2002 | Daoud | 277/602 |
| 6,454,549 B2 | * | 9/2002 | Shafer | 417/423.1 |
| 7,056,104 B2 | * | 6/2006 | Kimura et al. | 417/410.1 |

FOREIGN PATENT DOCUMENTS

| | | |
|---|---|---|
| JP | 60-249269 | 12/1985 |
| JP | 05-94521 U | 12/1993 |
| JP | 05-96552 U | 12/1993 |
| JP | 06-78629 U | 4/1994 |
| JP | 08-069829 A | 3/1996 |
| JP | 9-273481 | 10/1997 |
| JP | 2001-326003 | 11/2001 |
| JP | 2002-161857 | 6/2002 |
| JP | 2004-146177 A | 5/2004 |
| JP | 2004-353631 | 12/2004 |

OTHER PUBLICATIONS

Japanese Office Action for Application No. 2005-320701, issued May 18, 2010.

* cited by examiner

*Primary Examiner* — William H Rodriguez
*Assistant Examiner* — Philip Stimpert
(74) *Attorney, Agent, or Firm* — Locke Lord Bissell & Liddell LLP

(57) ABSTRACT

A mounting structure has a base member, a mounted member and a plurality of C-shaped retainer rings. The base member has an opening. The mounted member is fitted to the opening. The plurality of C-shaped retainer rings is fitted to the base member for preventing the mounted member from moving away from the base member.

13 Claims, 5 Drawing Sheets

MOUNTING STRUCTURE AND MOTOR COMPRESSOR HAVING THE SAME

BACKGROUND OF THE INVENTION

The present invention relates to a mounting structure and a motor compressor having the same.

A motor compressor driven by an electric motor is required to ensure the airtightness of its housing while allowing power from an external source to be supplied to a motor chamber of the compressor. For this reason, an airtight terminal to be mounted to the housing is generally known. One example of the airtight terminal is disclosed in Japanese Patent Application Publication No. 2004-190547, in which the airtight terminal is securely mounted to the housing by screw member.

However, a mounting structure using a conventional fixing manner has a problem in that a thicker base is required around a position to mount the airtight terminal. This is because screw members are used for fixing the airtight terminal and, therefore, the housing needs a sufficient thickness for screw holes. This also produces a problem in that the position of the airtight terminal is restricted.

In the conventional structure as shown in FIG. 1 of the above-cited Publication No. 2004-190547, the airtight terminal must be located remote from the middle of the housing. It is noted that the middle of the housing refers to the position of a line of intersection between the mounting plane for the airtight terminal that extends normal to the axis of the screw member and a plane that is normal to the mounting plane and includes the axis of drive shaft for the motor compressor.

The present invention is directed to a mounting structure that permits the housing to be made thinner than heretofore around the mounting position of the airtight terminal and also to a motor compressor having the same.

SUMMARY OF THE INVENTION

In accordance with the present invention, a mounting structure has a base member, a mounted member and a plurality of C-shaped retainer rings. The base member has an opening. The mounted member is fitted to the opening. The plurality of C-shaped retainer rings is fitted to the base member for preventing the mounted member from moving away from the base member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
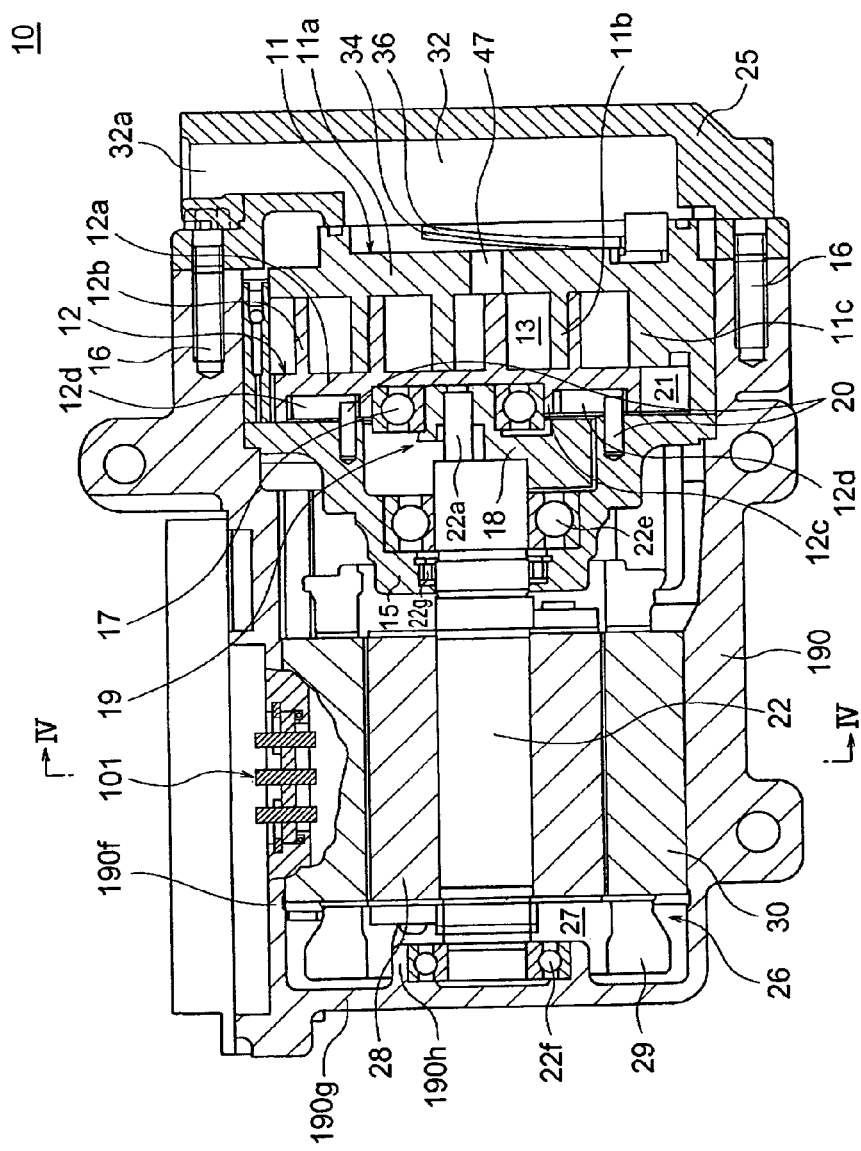
FIG. 1 is a longitudinal cross-sectional view of a motor compressor according to a first preferred embodiment of the present invention.

The following will describe a first preferred embodiment of a mounting structure used for a motor compressor 10 according to the present invention with reference to FIGS. 1 through 5.

The motor compressor 10 has a first housing 190 and a second housing 25, which are fastened together by a plurality of bolts 16. The first housing 190 is formed in a cylindrical shape, including a cylindrical portion 190f and an end 190g. The end 190g is formed with a cylindrical boss 190h for holding therein a ball bearing 22f. The motor compressor 10 includes a fixed scroll member 11 and a movable scroll member 12 which cooperate to form therebetween compression chambers 13. The fixed scroll member 11 has a disc-shaped fixed base plate 11a, a fixed scroll wall 11b extending from the fixed base plate 11a and an outermost fixed scroll wall 11c. The fixed base plate 11a has a discharge port 47 at the center thereof. In the motor compressor 10, the fixed scroll member 11, the movable scroll member 12 and the compression chambers 13 cooperate to form a compression mechanism. The movable scroll member 12 includes a disc-shaped movable base plate 12a and a movable scroll wall 12b extending from the movable base plate 12a. The movable base plate 12a is formed with a cylindrical boss 12c at the center on the back surface thereof for holding a ball bearing 17.

The motor compressor 10 further includes a crank mechanism 19 for orbiting the movable scroll member 12 and pins 20 for preventing self-rotation of the movable scroll member 12. The pins 20 are securely mounted to a shaft support member 15 and loosely fitted in respective annular recesses 12d of the movable scroll member 12. The crank mechanism 19 includes the boss 12c, a crank pin 22a of the drive shaft 22 and the ball bearing 17 fitted around the crank pin 22a through a bushing 18 for supporting the movable scroll member 12.

An airtight terminal 101 is mounted to the first housing 190. It is noted that the airtight terminal 101 and its surrounding are shown in FIG. 1 in cross-section taken along a plane that is different from that for the other parts of the compressor. The airtight terminal 101 has conductive members extending through the first housing 190 while maintaining airtightness between the motor chamber 27 and the outside of the compressor 10. The details of the airtight terminal 101 will be described later.

The motor compressor 10 has a driving motor 26, which is a three-phase synchronous motor for driving the compression mechanism, including the drive shaft 22 extending through the center of the driving motor 26, a rotor 28 fitted on the drive shaft 22 and a stator 30 located outside the rotor 28 and having a coil 29 wound therearound. Operation or rotational speed of the driving motor 26 is controlled by an inverter (not shown) in a manner well known in the art.

One end of the drive shaft 22 adjacent to the crank mechanism 19 is supported by the shaft support member 15 through a ball bearing 22e, while the other end is supported by the boss 190h of the first housing 190 through a ball bearing 22f. A seal 22g is provided on the rear side of the ball bearing 22e to seal the gap between the drive shaft 22 and the shaft support member 15. In FIG. 1, the right side which is adjacent to the second housing 25 is defined as the front side of the compressor 10, while the left side which is adjacent to the end 190g of the first housing 190 is defined as the rear side of the compressor 10.

A space defined by the first housing 190 and the second housing 25 is the chamber of the motor compressor 10, and refrigerant flows through this chamber. In the chamber of the motor compressor 10, a space defined by the first housing 190 and the shaft support member 15 is a motor chamber 27, and a space defined by the first housing 190, the second housing 25 and the shaft support member 15 is a crank chamber 21. The motor chamber 27 and the crank chamber 21 are in communication with each other through a suction passage (not shown).

A discharge chamber 32 is defined by the fixed scroll member 11 and the second housing 25 on the side opposite to the compression chambers 13 with the discharge port 47 disposed therebetween. A reed valve 34 and a retainer 36 are provided in the discharge chamber 32 for preventing backflow of refrigerant, that is, flow of refrigerant from the discharge chamber 32 toward the discharge port 47. The discharge chamber 32 has an outlet 32a that is in communication with the outside. This outlet 32a establishes fluid communication between the inside and outside of the motor compressor 10.

In the above motor compressor 10, refrigerant flows through a suction port (not shown) into the motor chamber 27, from which the refrigerant then flows into the crank chamber 21 and the compression chamber 13 that is in communication with the crank chamber 21 through a suction passage (not shown). In the compression chambers 13, refrigerant is compressed by orbital movement of the movable scroll member 12 in accordance with rotation of the drive shaft 22, flows into the discharge chamber 32 through the discharge port 47 and is then discharged through the outlet 32a.

Figure 4:
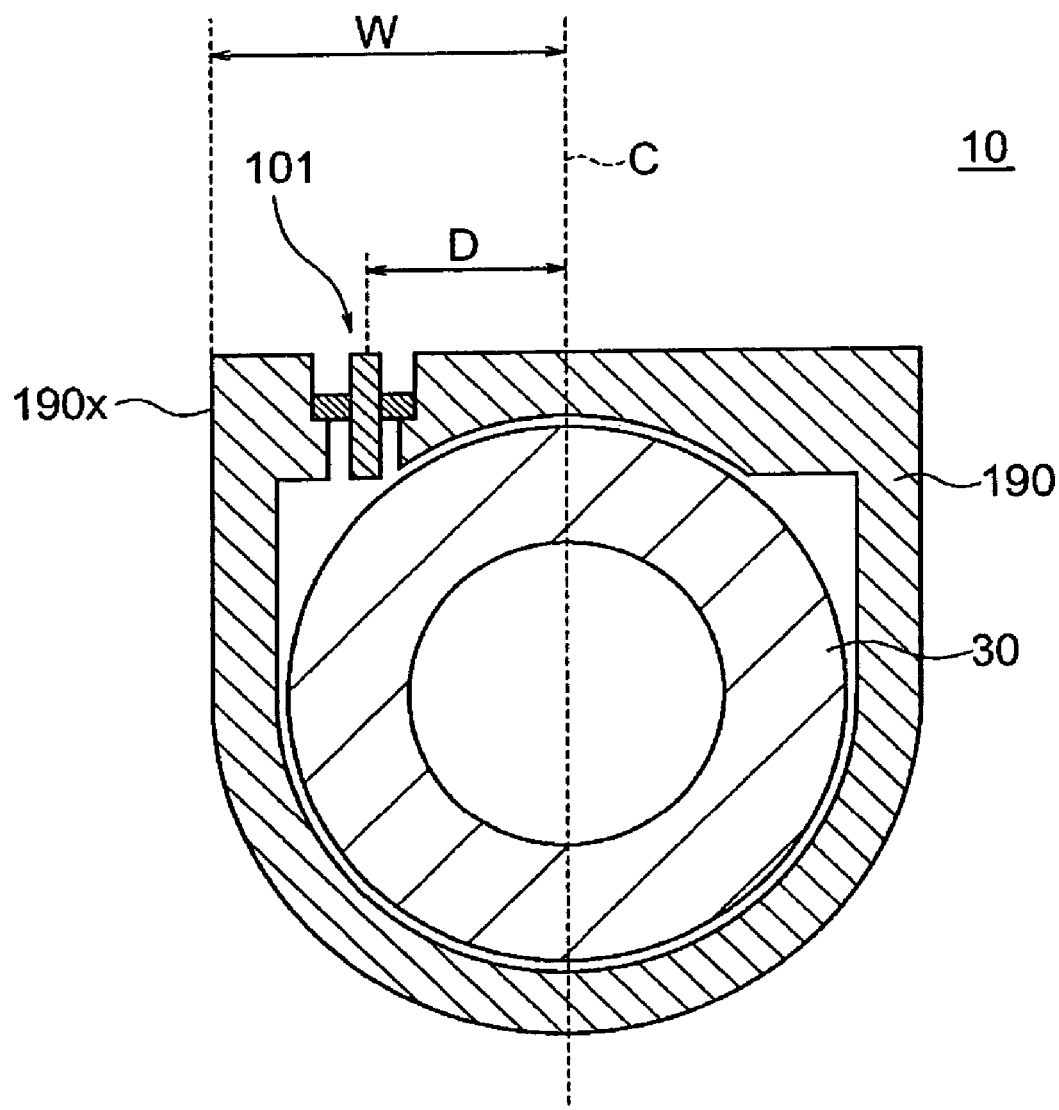
FIG. 4 is a cross-sectional view taken along the line IV-IV in FIG. 1.

For the sake of convenience, FIG. 4 shows only the airtight terminal 101, the first housing 190 and the stator 30. The airtight terminal 101 is located at a distance D from the center of the first housing 190, that is, an imaginary plane which is normal to the sheet of FIG. 4 and including the centerline C in FIG. 4. In FIG. 4, the distance D is shorter than a distance W between the centerline C and the end 190x of the first housing 190.

Figure 2:
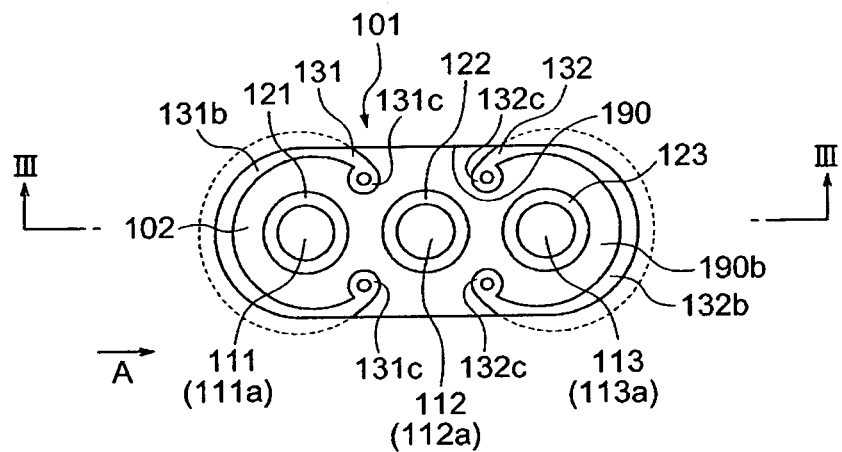
FIG. 2 is a view showing a state where an airtight terminal is mounted to a first housing according to the first preferred embodiment of the present invention.
Figure 3:
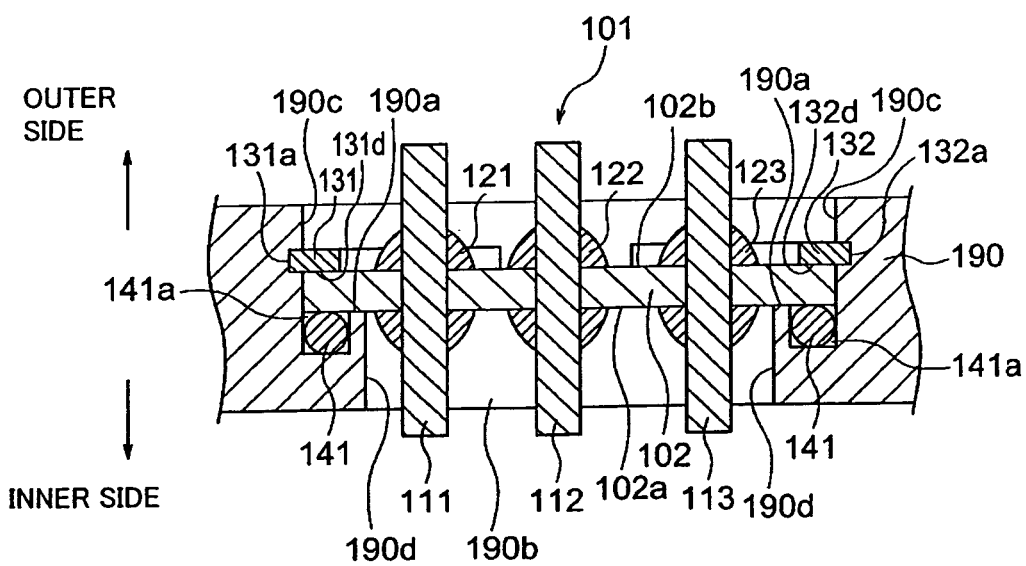
FIG. 3 is a cross-sectional view taken along the line III-III in FIG. 2.

Referring to FIGS. 2 and 3, the airtight terminal 101, which corresponds to a mounted member in this embodiment, is mounted to the first housing 190, which corresponds to a base member in this embodiment. The airtight terminal 101 sealingly separates the inside of the first housing 190 from the outside of the compressor 10. The airtight terminal 101 includes an electrically insulative support member 102. The support member 102 is made of a plate which is formed in a shape of a track, i.e. a shape consisting of two semicircles connected by parallel lines tangent to their endpoints, and has three holes 111a, 112a, 113a through which three conductive members 111, 112, 113 extend, respectively. Of these holes 111a, 112a, 113a, the hole 112a is located at the middle of the two parallel lines of the support member 102, and the holes 111a and 113a are located at the center of the respective semi-circles thereof, respectively. These holes 111a, 112a, 113a are aligned on the same line.

The conductive members 111, 112, 113 are supported by extending through these three holes 111a, 112a, 113a. Each of the conductive members 111, 112, 113 has a solid cylindrical shape with the same diameter as the holes 111a, 112a, 113a. The conductive members 111, 112, 113 are fitted into the holes 111a, 112a, 113a and fixed at the longitudinally middle portions thereof. Each of the conductive members 111, 112, 113 corresponds to each one of the three-phase lines of the driving motor 26 and is electrically connected to the respective coil.

Adhesive designated by 121, 122, 123 is applied to portions where the conductive members 111, 112, 113 are supported by the support member 102 and their vicinities around the conductive members 111, 112, 113. Thus, the support member 102 and the conductive members 111, 112, 113 are bonded together securely. The adhesive 121, 122, 123 is typically made of resin, but other adhesives or fixing materials, such as rubber and glass, are usable as far as they fix the conductive members 111, 112, 113 to the support member 102.

The first housing 190 has an opening 190b for mounting the airtight terminal 101. The first housing 190 includes a large-diameter wall surface 190c and a small-diameter wall surface 190d, which surround the opening 190b, and a step 190a formed at the boundary between the surfaces 190c, 190d. The area of the opening 190b at the large-diameter wall surface 190c formed on the outer side of the first housing 190 is larger than that of the small-diameter wall surface 190c formed on the inner side of the first housing 190. The airtight terminal 101 will be mounted to the first housing 190 such that the support member 102 is fitted in the opening 190b with the inner surface 102a of the support member 102 set in contact with the step 190a. As shown in FIG. 3, the cylindrical conductive members 111, 112, 113 extend axially in the same direction as the thickness direction of the first housing 190.

An O-ring groove 141a, or a rectangular groove that opens toward the support member 102, is formed in the surface at the step 190a between the large-diameter and small-diameter wall surfaces 190c and 190d of the first housing 190 for receiving therein an O-ring 141. The support member 102 is set in the opening 190b of the first housing 190 with the inner surface 102a of the support member 102 pressed against the O-ring 141 thereby to airtightly close the opening 190b of the first housing 190. Thus, a seal structure is formed between the first housing 190 and the airtight terminal 101 for sealingly closing the opening 190b of the first housing 190 of the motor compressor 10. The airtight terminal 101 is in contact with the O-ring 141 of the seal structure on the side adjacent to the axis of the motor compressor 10.

C-shaped circlips 131, 132, which correspond to retainer rings in this embodiment, are used for securing the airtight terminal 101 in place to the first housing 190. The circlip 131 has a known structure having a C-shaped body 131b and two annuluses 131c provided at the opposite terminating ends of the body 131b. Engaging the tip ends of a fitting tool, such as a pair of pliers, with the annulus 131c and then applying a force appropriately, the shape of the body 131b may be deformed inwardly. The circlip 131 thus inwardly deformed is inserted in place in the opening 190b. The circlip 132 shown on the right side of FIGS. 2 and 3 has the same shape as the circlip 131, having a C-shaped body 132b and two annuluses 132c.

Circlip grooves 131a, 132a, which correspond to rectangular retainer ring grooves in this embodiment, are formed in the large-diameter wall surface 190c of the first housing 190 for receiving therein the circlips 131, 132, respectively. The circlips 131, 132 are supported by the circlip grooves 131a, 132a, respectively and are in contact with the outer surface 102b of the support member 102 for preventing outward movement of the support member 102. Thus, the airtight terminal 101 is prevented from moving away from the first housing 190, that is, the step 190a. The circlips 131, 132 are in contact with the airtight terminal 101 at single flat contact surfaces 131d, 132d, respectively.

As shown in FIG. 2, two circlips 131, 132 are disposed in a mirror-image relation or with a reversal of right and left. The direction of the circlip 131 is defined as a direction in which the middle point between the annuluses 131c is located with respect to the center of an imaginary circle of the body 131b. The direction of the circlip 131 is indicated by the arrow A in FIG. 2, as seen from the center of the body 131b toward the center of gravity of the circlip 131. The direction of the circlip 132 is also defined in the same way. The circlips 131, 132 are located at positions that do not overlap each other as seen from each end surface thereof. Thus, the side wall surrounding the opening 190b has circlip grooves 131a, 132a formed along the side wall and a step 190a extending toward the center of the opening 190b below the circlip grooves 131a, 132a.

In FIG. 3, the O-ring 141 which is in contact with the support member 102 urges the support member 102 outward. Outward movement of the support member 102 is prevented by the circlips 131, 132, so that the O-ring 141 is pressed against the inner surface 102a of the support member 102. Meanwhile, the O-ring 141 is also pressed against the first housing 190, so that the first housing 190 adjacent to the airtight terminal 101 is sealingly closed. The adhesive 121, 122, 123 which fixes the support member 102 to the conductive members 111, 112, 113 seals the gap between the support member 102 and the conductive members 111, 112, 113 to ensure complete sealing of the airtight terminal 101. Thus, the airtight terminal 101 is located on the step 190a, and a plurality of the circlips 131, 132 is provided on the upper surface of the airtight terminal 101, that is, the outer surface 102b of the support member 102 so as to be fitted in the circlip grooves 131a, 132a, respectively. This structure restricts outward movement of the airtight terminal 101.

As described above, the airtight terminal 101 according to the first preferred embodiment is fixed to the first housing 190 by means of the circlips 131, 132, thus dispensing with a screw member for fixing the airtight terminal 101. This eliminates the need of providing a housing that is thick enough to form therethrough screwing holes, but permits the use of a housing with a reduced thickness around the airtight terminal 101.

Therefore, the compressor housing may be designed with a higher degree of freedom regarding the position where the airtight terminal is mounted to the housing. In the example shown in FIG. 1 of Japanese Patent Application Publication No. 2004-190547, the airtight terminal must be located at an end of the housing or a part thereof adjacent to the end having a sufficient thickness. Namely, the airtight terminal may only be mounted at a position of the housing having a larger dimension for the distance D of FIG. 4. According to this embodiment, on the other hand, the position of the airtight terminal 101 is not limited to the end 190x of the first housing 190, but the airtight terminal 101 may be provided at a position closer to the centerline C as shown in FIG. 4, that is, a position where the distance D is relatively short.

Thus, the airtight terminal 101 of the above-described first preferred embodiment helps to reduce the wall thickness for mounting structure of the airtight terminal 101 and also improves the degree of freedom of position for mounting the airtight terminal 101 to the first housing 190.

In the first preferred embodiment, the circlips 131, 132 are disposed in a mirror-image relation as shown in FIG. 2, but the disposition is not limited to this arrangement. For example, the circlips may be disposed in position opposing each other, which is defined as such a disposition that an angle made between the directions of the circlips 131, 132 is more than 90 degrees.

In the first preferred embodiment, the flat contact surfaces 131d, 132d where the circlips 131, 132 are in contact with the airtight terminal 101 lie in the same plane, but the contact surfaces 131d, 132d need not be in the same plane. For example, they may be in parallel relation to each other.

Figure 5:
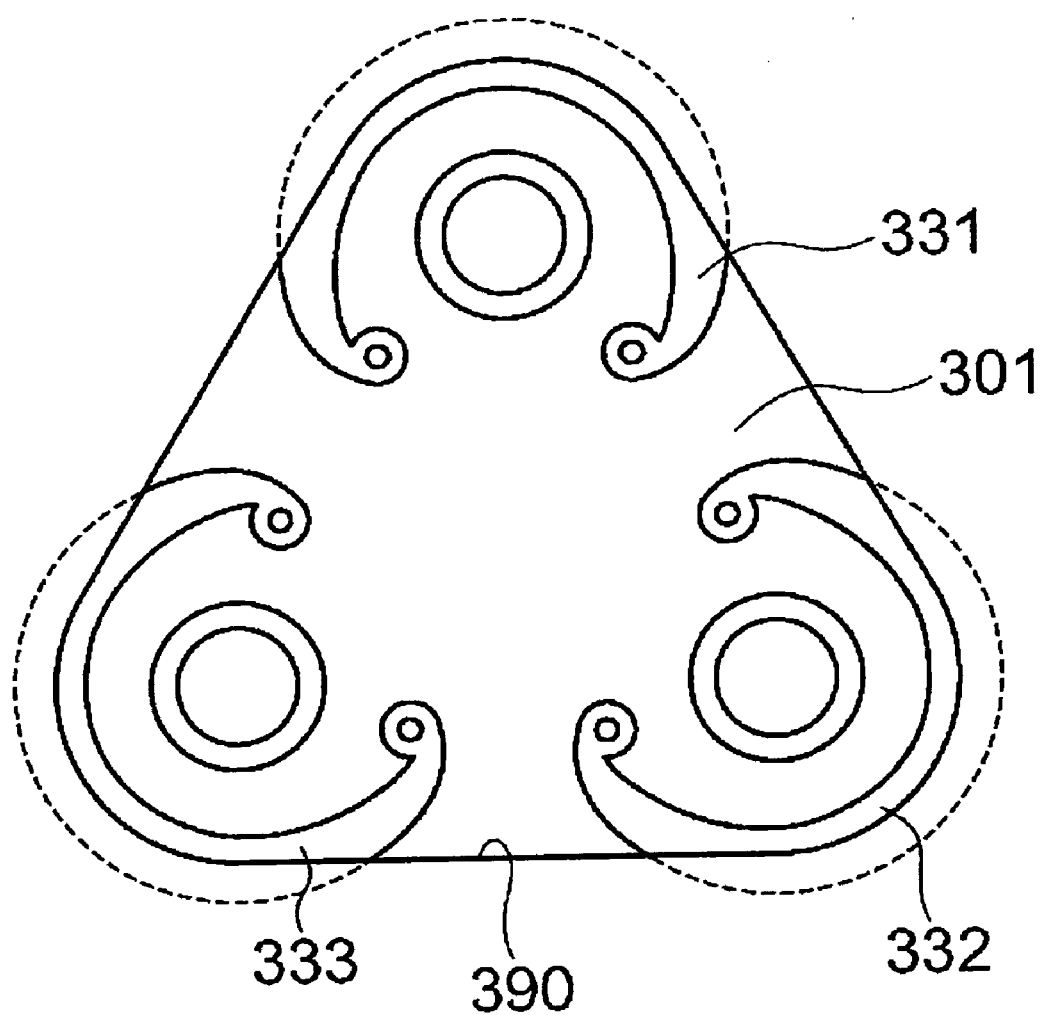
FIG. 5 is a modified example corresponding to FIG. 2 according to the first preferred embodiment of the present invention.

In the first preferred embodiment, the airtight terminal 101 is fixed by two circlips 131, 132. Three or more circlips may be used for fixing the airtight terminal. FIG. 5, which corresponds to FIG. 2, shows an alternative embodiment wherein the airtight terminal 301 is fixed by three circlips 331, 332, 333 to the first housing 390.

In FIG. 5, the angle made between any two adjacent circlips 331, 332, 333 is 120 degrees. Additionally, the circlips may be arranged in any other ways such that the angle made by any two adjacent circlips is more than 90 degrees. For fixing the airtight terminal 301, at least two out of the circlips 331, 332, 333 should preferably be disposed in the opposite relation to each other. According to this embodiment, however, the circlips may be arranged such that any two adjacent circlips are not opposite to each other. Furthermore, in a structure having four or more circlips, at least two circlips should preferably be disposed in the opposite relation to each other. According to this embodiment, however, the circlips may be arranged such that any two adjacent circlips are not opposite to each other.

The first preferred embodiment relates to a structure for the motor compressor 10, but it is not limited to a motor compressor. The present invention is also applicable to any other machines having a structure for fixing an airtight terminal to a housing. Though the foregoing description has been made with reference to a scroll type compressor, the invention is also applicable to a swash plate type compressor. In the first preferred embodiment, the airtight terminal 101 which is a mounted member in the first preferred embodiment is fixed to the first housing 190 which is a base member in the first preferred embodiment, but the mounted member and the base member are not limited to the airtight terminal and the housing in the above description. In the first preferred embodiment, the O-ring 141 is used as a seal member in the first preferred embodiment, but any other members or structures having a sealing function is usable. If a sealing function is not required, a seal member may be omitted.

Figure 6:
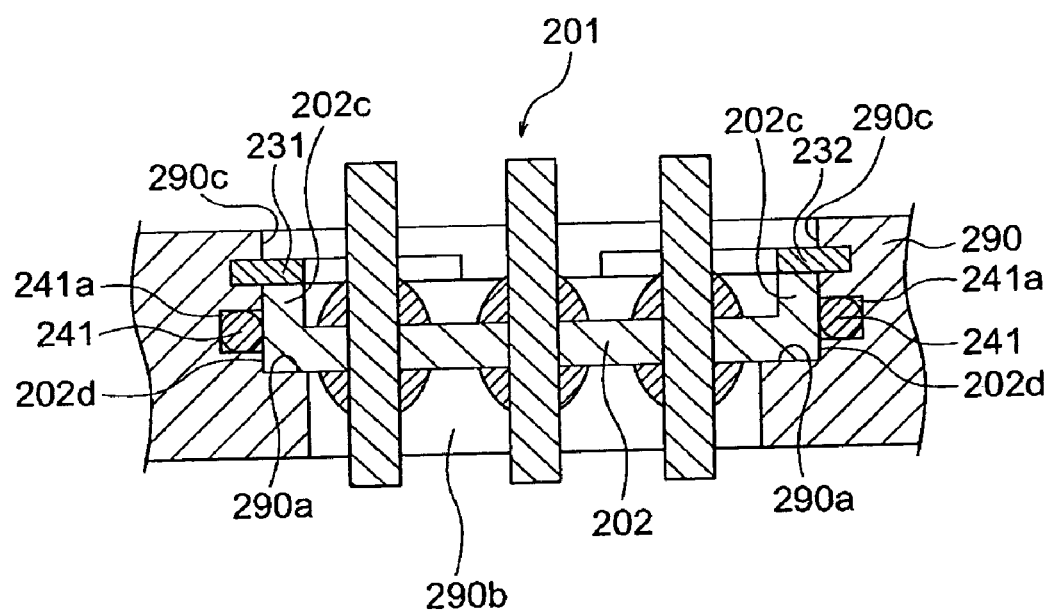
FIG. 6 is a cross-sectional view showing a state where an airtight terminal is mounted to a first housing according to a second preferred embodiment of the present invention.

The following will describe a second preferred embodiment of a mounting structure having an airtight terminal 201 according to the present invention with reference to FIG. 6. The seal structure in the first preferred embodiment is designed to seal the bottom surface of the airtight terminal 101. On the other hand, the seal structure in the second preferred embodiment is arranged so as to seal the side surface of the airtight terminal 201. The following will describe only the points that are different from the first preferred embodiment.

The support member 202 is made of a plate which is formed in a shape of a track, i.e. a shape consisting of two semicircles connected by parallel lines tangent to their endpoints, and has a thick portion 202c at its periphery.

Unlike the O-ring groove 141a of the first preferred embodiment which is formed in the surface at the step 190a, the rectangular O-ring groove 241a is formed in the large-diameter wall surface 290c of the opening 290b for receiving therein the O-ring 241. The O-ring 241 is press-fitted in its groove 241a between the outer peripheral surface 202d of the support member 202 and the first housing 290 thereby to sealingly close the opening 290b of the first housing 290. Thus, the airtight terminal 201 is in contact with the O-ring 241 in a direction that is perpendicular to the extension of the support member 202 in the opening 290b. Since the thick portion 202c is formed at the periphery of the airtight terminal 201, the outer peripheral surface 202d of the support member 202 has a sufficient area for obtaining good sealing performance by contacting with the O-ring 241.

To fix the airtight terminal 201 to the first housing 290, C-shaped circlips 231, 232 are used. The circlips 231, 232 are in contact with the thick portion 202c of the support member 202 to prevent outward movement of the support member 202. The airtight terminal 201 according to the second preferred embodiment has such a structure that the outer peripheral surface 202d of the support member 202 is in contact with the O-ring 241, so that the support member 202 and the O-ring 241 may be disposed to overlap each other in the thickness direction of the first housing 290. Accordingly, the mounting structure around the airtight terminal 201 may be made with a further reduced thickness.

The present examples and embodiments are to be considered as illustrative and not restrictive, and the invention is not to be limited to the details given herein but may be modified within the scope of the appended claims.

What is claimed is:

1. A mounting structure for use in a motor-driven compressor, comprising:
    a base member being a housing of the compressor and having an opening, the base member having a side wall that surrounds the opening, and the side wall having a retainer ring groove recessed along the side wall and a step extending toward a middle of the opening below the retainer ring groove;
    a mounted member fitted to the opening, wherein the mounted member is disposed on the step; and
    a plurality of C-shaped retainer rings fitted to the base member for preventing the mounted member from moving away from the base member, wherein the plurality of C-shaped retainer rings fitted in the retainer ring groove contact an upper surface of the mounted member to restrict movement of the mounted member, wherein each of the C-shaped retainer rings includes a body fitted in the retainer ring groove, opposite ends of the body extending out of the retainer ring groove toward a middle of the mounted member,
    wherein the mounted member is an airtight terminal having a conductive member.

2. The mounting structure according to claim 1, wherein at least two out of the C-shaped retainer rings are opposed to each other.

3. The mounting structure according to claim 2, wherein the C-shaped retainer rings include C-shaped body and two annuluses provided at each end of the body, wherein an opening direction of each retainer ring is defined as a direction as seen from a middle of the body toward a middle between the two annuluses, and wherein an angle made between the respective opening directions of the opposed C-shaped retainer rings is more than 90 degrees.

4. The mounting structure according to claim 1, wherein the C-shaped retainer rings are located at positions that do not overlap as seen from each end surface thereof.

5. The mounting structure according to claim 1, further comprising:
    a seal structure provided between the base member and the mounted member to isolate a first side of the base member from a second side.

6. The mounting structure according to claim 5, wherein the seal structure seals a bottom surface of the mounted member.

7. The mounting structure according to claim 5, wherein the seal structure seals a side surface of the mounted member.

8. The mounting structure according to claim 5, wherein the seal structure includes an O-ring.

9. The mounting structure according to claim 1, wherein the airtight terminal has a plurality of the conductive members.

10. The mounting structure according to claim 1, wherein the motor-driven compressor comprises:
    a compression mechanism; and
    a motor for driving the compression mechanism, wherein the housing sealingly separates an inside of a motor chamber where the motor is located from outside.

11. The mounting structure according to claim 1, wherein the motor-driven compressor comprises is a three-phase motor, wherein the airtight terminal has three conductive members which are in correspondence to respective phases of the three-phase motor.

12. A mounting structure for use in a motor-driven compressor, comprising:
    a base member being a housing of the compressor and having an opening, the base member having a side wall that surrounds the opening, and the side wall having a retainer ring groove recessed along the side wall and a step extending toward a middle of the opening below the retainer ring groove;
    a mounted member fitted to the opening, wherein the mounted member is disposed on the step; and
    a plurality of C-shaped retainer rings fitted to the base member for preventing the mounted member from moving away from the base member,
    wherein the plurality of C-shaped retainer rings each has a single flat contact surface in contact with the mounted member, and the flat contact surfaces are in parallel relation to each other, and
    wherein the plurality of C-shaped retainer rings fitted in the retainer ring groove is located on an upper surface of the mounted member to restrict movement of the mounted member, wherein each of the C-shaped retainer rings includes a body fitted in the retainer ring groove, opposite ends of the body extending out of the retainer ring groove toward a middle of the mounted member.

13. The mounting structure according to claim 12, wherein the flat contact surfaces in contact with the mounted member are in the same plane.

* * * * *